United States Patent [19]

Kibble et al.

[11] 4,010,451
[45] Mar. 1, 1977

[54] DATA STRUCTURE PROCESSOR

[75] Inventors: David John Kibble, Burgess Hill; Richard Lawrence Grimsdale, Brighton, both of England

[73] Assignee: National Research Development Corporation, London, England

[22] Filed: July 24, 1975

[21] Appl. No.: 598,877

Related U.S. Application Data

[63] Continuation of Ser. No. 401,612, Sept. 28, 1973.

[30] Foreign Application Priority Data

Oct. 3, 1972 United Kingdom ............ 45494/72

[52] U.S. Cl. ............................................. 340/172.5
[51] Int. Cl.² ....................... G06F 9/20; G06F 9/10
[58] Field of Search ................... 340/172.5; 445/1

[56] References Cited

UNITED STATES PATENTS

| | | | |
|---|---|---|---|
| 3,675,215 | 7/1972 | Arnold et al. | 340/172.5 |
| 3,723,976 | 3/1973 | Alvarez et al. | 340/172.5 |
| 3,761,881 | 9/1973 | Anderson et al. | 340/172.5 |
| 3,764,996 | 10/1973 | Ross | 340/172.5 |
| 3,781,808 | 12/1973 | Ahearn et al. | 340/172.5 |
| 3,786,427 | 1/1974 | Schmidt et al. | 340/172.5 |
| 3,854,126 | 12/1974 | Gray et al. | 340/172.5 |

*Primary Examiner*—Mark E. Nusbaum
*Attorney, Agent, or Firm*—Cushman, Darby & Cushman

[57] ABSTRACT

Data processing apparatus, particularly for use with a computer, is described which includes a primary store and an address translator. The primary store which has a fast access time compared with the main computer store is addressed by virtual addresses applied to the translator, each virtual address being associated with a particular real address for the primary store. The associations between real and virtual addresses can be changed by program instructions so leading to shorter programs and faster computer operation. Similar advantages are also gained by logic circuits for changing one or more of the more significant bits of the virtual addresses, under program instructions, and of addresses for a secondary store also of fast access time.

9 Claims, 5 Drawing Figures

REAL ADDRESS-READ OUT

DATA STRUCTURE PROCESSOR

This is a continuation of application Ser. No. 401,612 filed Sept. 28, 1973.

The present invention relates to data structure processors, that is processor circuits which may form part of a computer to allow the manipulation of data structures. The processor of the invention is particularly, but not exclusively, useful in computer systems for providing graphical displays.

Three data structures, the list, tree and ring structures which are described in more detail below, are important in graphics software compilation, text editing and string manipulation. In the manipulation of these and other data structures conventional processors suffer from the disadvantage that there is insufficient emphasis on interchange of data and more emphasis on arithmetical operations. For example where certain parameters are used by a computer in providing a graphic display and it is desired perhaps to change one of these parameters, the recalculation of the whole set of co-ordinates and vectors can be avoided by using a suitable data structure in the computer store or stores. Manipulation of the data structure by means of a data structure processor allows the co-ordinates and vectors to be found with the minimum of recalculation.

It is an object of this invention to provide a data structure processor which facilitates the manipulation of data structures.

According to the present invention there is provided apparatus for data processing including a primary store for storing items of data at a plurality of storage locations, each location having a unique real address which when applied to an address input of the primary store in the form of an address signal allows the item stored at that address to appear at the output of the primary store, and an address translator with output coupled to the address input of the primary store for translating virtual addresses into real addresses, each real address being associated with one virtual address particular thereto, the real address signal appearing at the translator output when the associated virtual address is applied to the translator in the form of a virtual address signal, and the translator including means for changing the associations between real and virtual addresses in response to instruction signals applied thereto.

Apparatus according to the invention has the advantage that when used, for example with a conventional computer, the locations of items of data in the form of virtual locations can be changed quickly, without in fact moving the data, by changing the virtual addresses of the data items. In this way the time for execution of a programme in the computer is shortened. In addition the provision of a processor according to the invention allows many programmes to be shortened.

Preferably the apparatus includes a relatively large main store which may be the main store of a computer and which can have a moderately short access time and the primary store is a small store with a very short access time. For example the main store may be a core store while the primary store is an integrated circuit comprising a number of bistable circuits forming registers. With such an arrangement data in the primary store can be transferred from one virtual location to another quickly since the store is small and the addresses to be changed in transfer are therefore short. Data channels are provided between the primary store and the main store to allow items of data to be read from the main store into the primary store and vice versa, with the addresses of the main store locations for read in and out being held temporarily in the primary store.

The addition to the apparatus of logic means for changing one or more of the bits of a virtual address according to a signal or signals applied to the logic means adds another facility which shortens programmes or allows one subroutine to be used for two similar functions. The logic means may include one exclusive OR circuit for each bit which may or may not be changed in dependence on a binary signal applied to the logic means. The binary signal may be supplied from a bistable store which is under the control of the programme controlling operation of the apparatus.

A secondary store also of small size and fast access time may be provided to allow data to be manipulated quickly between the primary and secondary stores without the need in many operations for the main store to be accessed.

The apparatus may also include a programme store to hold instructions to be made. Commonly occurring sequences of instructions may be held in a micro-programme store which may be a read-only memory. An instruction received from the programme store may be executed by performing a sequence of micro-instructions from the micro-programme store. The micro programme store or the programme store being coupled to the translator to cause changes of associations between real and virtual address to be made.

Where the apparatus is part of a computer, conventional input and output facilities will be provided but otherwise they must, of course, be provided. Since the apparatus will often be part of a graphical display system it will then be linked to vector generation apparatus and some form of graphical output such as a cathode ray tube.

The translator is preferably constructed to change only one or more of the more significant bits in the virtual addresses associated with the real addresses. This has the effect of changing the association between a block of virtual and real addresses, rather than individual words; such a block may be used to store a plex, that is a group of words grouped together to give a unit of interrelated data items.

The translator may include a number of groups of first bistable circuits, one group for the virtual address of each block and adapted to hold the real address of the bits identifying the block. The translator includes two decoder circuits for receiving the virtual addresss of the blocks and providing a unique output signal for each virtual address. The first bistable circuits are coupled by way of a group of first gates to the translator output, the gates being enabled by the first decoder circuit outputs and a first clock pulse from a clock pulse generator.

The means for changing associations between real and virtual addresses may then include first and second groups of second bistable circuits, the number of second bistable circuits in each group being equal to the number of bits identifying each block. The first bistable circuits are coupled by means of the first gates and a group of second gates to the input set terminals of the second bistable circuits in the first and second groups, respectively. The second gates are, in operation, enabled by the output signals of a second decoder circuit and the first clock pulses. Groups of third and fourth gates are also provided between the output terminals of the second bistable circuits and the set terminals of the first bistable circuits. The third and fourth gates are enabled by the first and second decoder circuit outputs, respectively, in the presence of a second clock pulse.

The virtual addresses associated with two real addresses can be changed over by applying the two virtual addresses to the two decoders, respectively, and by applying the first and subsequently the second clock pulse. On the first clock pulse the real addresses associated with the virtual addresses are written into respective groups of second bistable circuits and on the second clock pulse the real addresses are written into respective groups of first bistable circuits. However, the decoder outputs are so connected to the second gates that the two real addresses change places in the groups of first bistable circuits as a result of transmission by way of the second bistable circuits.

An embodiment of the invention will now be described, by way of example, with reference to the accompanying drawings, in which.

Figure 1:
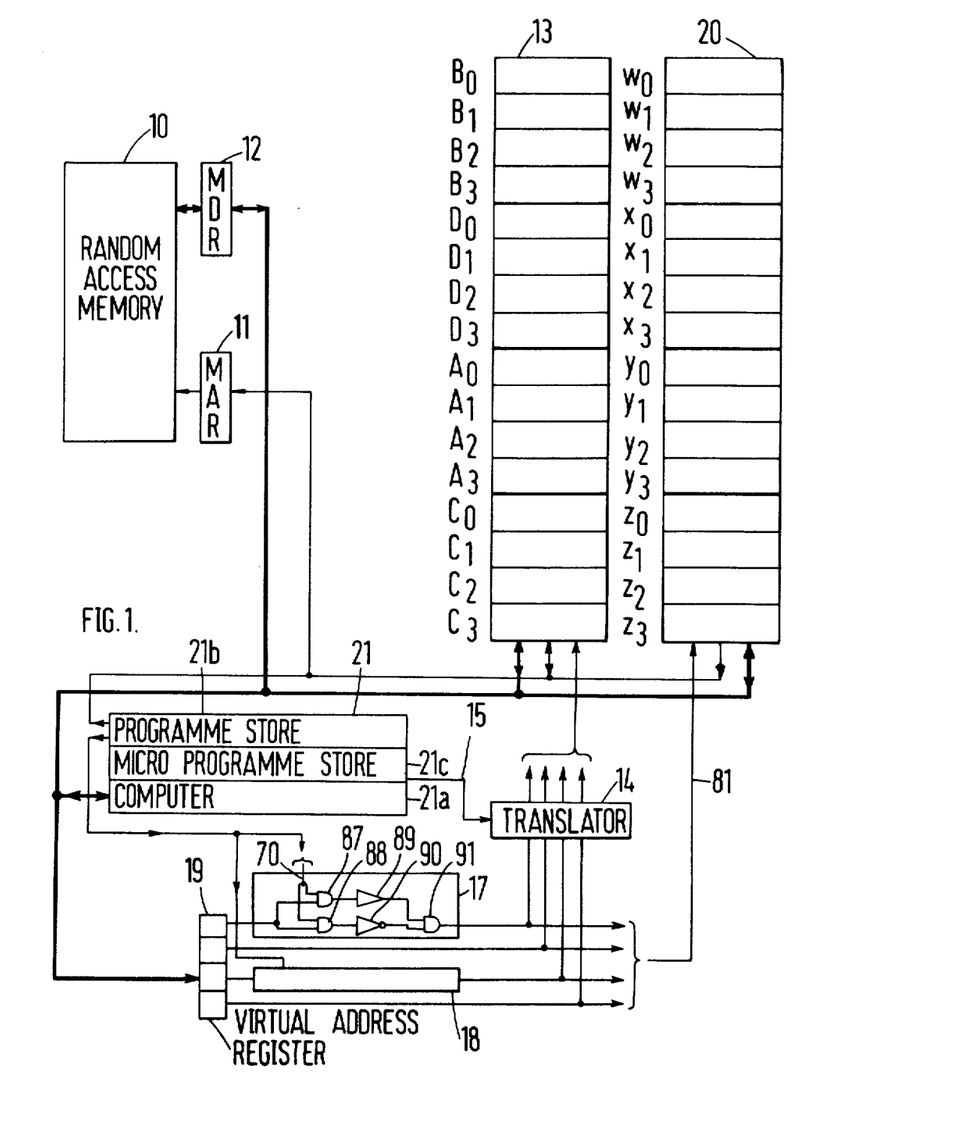
FIG. 1 is a block diagram of a data processor according to the invention.

In FIG. 1 a control circuit 21 includes a programme store 21b, and a read only memory formed by a microprogramme store 21c for sub-routines. The programme store 21b may be part of a random access memory (RAM) 10 explained in more detail below, and suitable read only memories are described in "Digital Storage Systems" by W. Renwick and A. J. Cole, published by Chapman and Hall, 1971, Chapter 10, particularly Sections 10.1 and 10.5. The control circuit 21 also includes a computer 21a which consists of known circuits each found in most conventional computers. Programmes written for the computer 21a are executed partly in a conventional manner and partly by the use of special instructions which employ a data structure processor which includes a primary store 13, an address translator 14 and logic circuits 17 and 18. Since the functioning and structure of the computer and the transfer of data items between the component circuits of FIG. 1 are not part of the present invention and many examples will be familiar to those skilled in the art, they are not described in this specification although their functions will become apparent from the following description. However the flow of information between memories and registers is discussed in 'Digital Computer Fundamentals' by Thomas C. Bartee, published by McGraw-Hill in 1966, Sections 6.2 pages 154 to 157, Sections 9.1 to 9.6 and Section 9.10; and also in 'Digital Computer System Principles', by H. Hellerman, published by McGraw-Hill in 1967, Section 5.3, pages 212 to 214. In FIG. 1 channels for data transfer are indicated by thick lines while control channels are indicated by thin lines.

The random access memory (RAM) 10 stores 4,096 16-bit words and thus each of these words can be addressed by 12 bits. For access to the RAM addresses are presented to a memory access register (MAR) 11 and data read out or read in is passed through a data register (MDR) 12. Words may be transferred to the MAR from the primary store 13 to serve as addresses to locations in the RAM. Data may be transferred between the MDR and the primary store 13 which for speed of operation is in the form of an integrated circuit but the MAR and MDR are also used by other circuits to give access to the main store. The primary store consists of sixteen 16-bit registers but it is considered as being divided into four groups of four 16-bit registers each of which in operation holds one data structure unit (DSU) used in this embodiment of the invention.

The primary store is always addressed by way of an address translator 14 using virtual addresses designated in groups A, B, C and D with individual words as $A_0$, $A_1$, $A_2$, $A_3$, $B_0$ . . . $D_2$, $D_3$. In FIG. 1 these virtual addresses are shown next to the register 13 and to illustrate that the actual addresses to which these virtual addresses refer can be in any position, the designations are not located in a sequential order.

In order to save operation time and to reduce the length of computer programmes DSU's held in the primary store are not moved from one location to another during operation, but instead each location is given a virtual address which can be changed by using the address translator 14. Instructions for change of virtual address are passed along a channel 15 from the micro programme store 21c. The address translator 14 is connected by way of the two identical logic circuits 17 and 18 to a 4-bit virtual address register 19 and virtual addresses are received from the RAM 10, the primary store 13, a secondary store 20 and the computer 21a. This transfer of data is made under the control of the control circuits 21. The purpose of the circuits 17 and 18 will be explained later. For clarity only the gates and amplifiers of the circuit 17 are shown. An AND gate 88, two amplifier 89, an inverting amplifier 90 and AND gates 87 and 91 are provided.

The secondary store 20 which also stores four groups of four 16-bit words and is coupled to the MAR 11 and the MDR 12, is also provided to allow fast movement of DSU's required before return to the main store. The secondary store has no virtual address facility and its locations are designated $W_0$ to $Z_3$.

The primary and secondary stores have a channel to the computer control circuit 21 which exercises control over the operation of the apparatus of FIG. 1 in a conventional way which will be familiar to those with a knowledge of computers. The control circuits 21 have access to the main store 10 by way of the MDR 12 using the MAR 11.

Figure 2A:
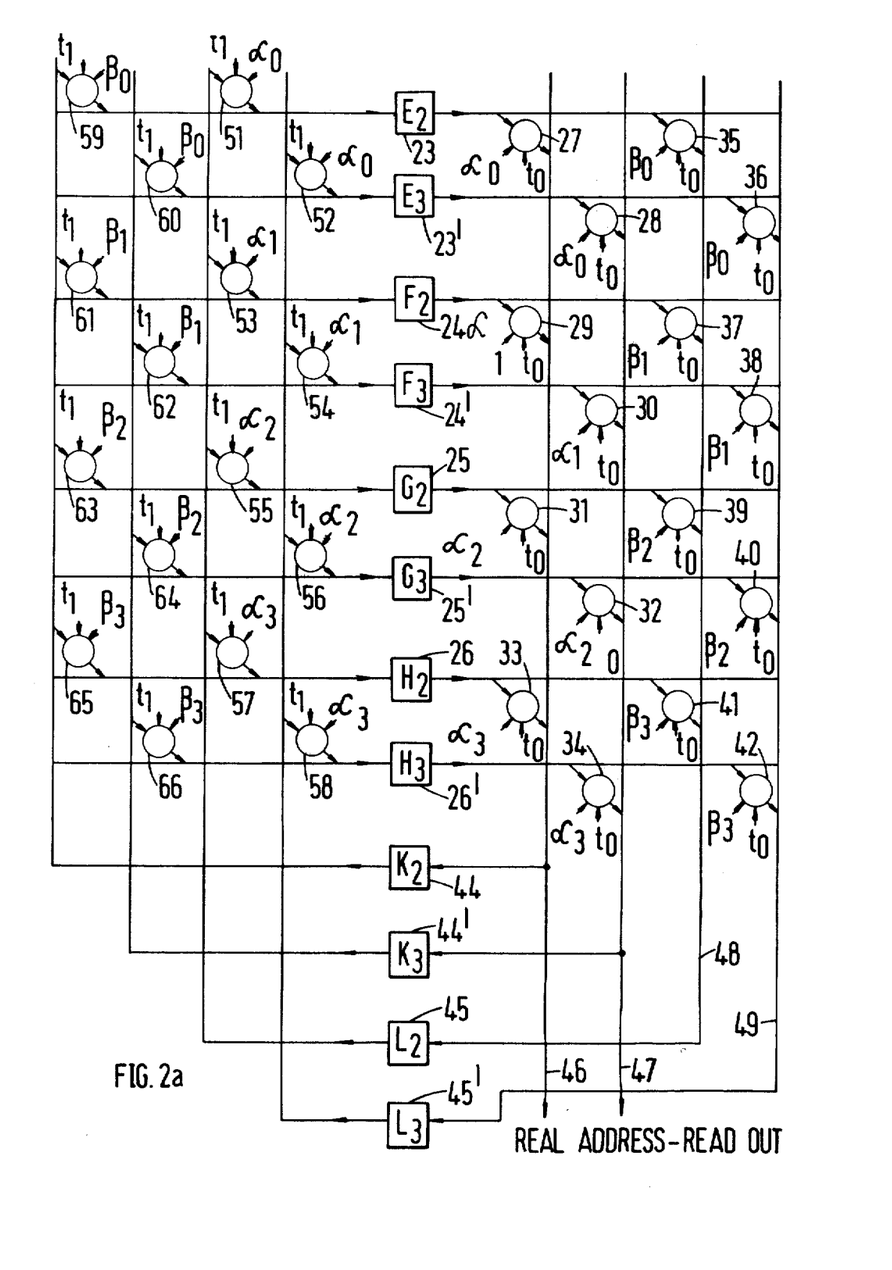
FIGS. 2(a) and 2(b) for a block diagram of a translator which may be used in the arrangement of FIG. 1.
Figure 2B:
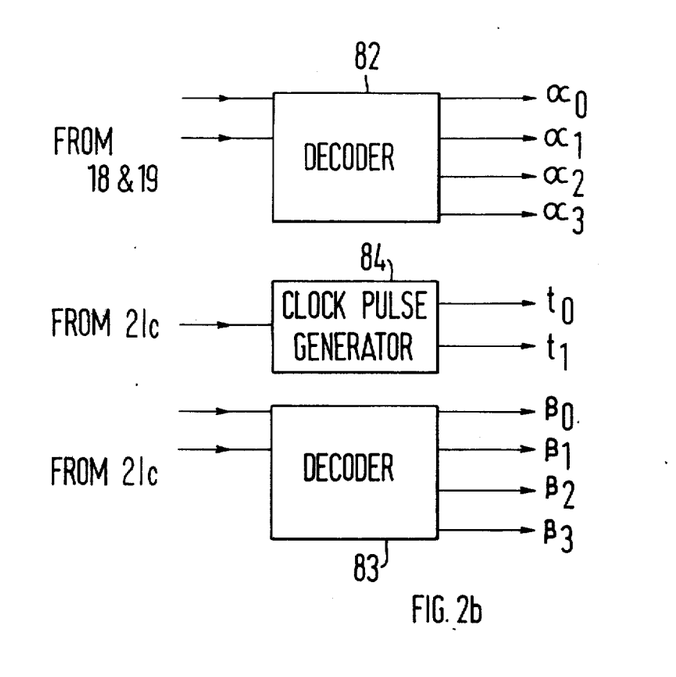

The address translator will now be described in more detail with reference to FIGS. 2(a) and 2(b). The translator has eight bistable circuits forming single bit stores 23, 23', to 26, 26'. The single bit stores are in four groups, one of which is the group 23, 23'. In operation each group contains the real address of one DSU location in the primary store. Since there are four DSU locations in the primary store two bits are required to address each location. The two most significant bits are used for this address and the next two most significant bits give access to the individual words in each DSU. The real address of a DSU location in the primary store is obtained by opening selected pairs of gates in the gates 27 to 34.

To obtain a real address of a plex location, each virtual address in the form of 2 bits is applied to a decoder 82 of known type which from the 2 bits provides one of four outputs $\alpha_0$ to $\alpha_3$.

To change virtual addresses (for example by use of the instruction written as EXC A, B) a further decoder 83 of known type is also required which provides the outputs $\beta_0$ to $\beta_3$. The decoders 82 and 83 form part of the translator 14. Two further pairs of single bit registers 44, 44' and 45, 45' are also used to allow changes of virtual address by moving the bits stored by the registers 23, 23' to 26, 26' from one pair of stores to another. Thus the actual addresses of the locations in the primary stores are moved around in the registers 23, 23' to 26, 26' when the EXC instruction is obeyed.

As an example, if the virtual address A is associated with the real address given by the bits stored in the registers 23, 23' and the bits stored in the two bits representing the virtual address A are applied from the circuits 18 and 19 to the decoder 82, then this decoder provides an output $\alpha_0$. AND gates 27 and 28 are opened by the output $\alpha_0$ when a clock pulse $t_0$ is applied from a clock pulse generator 84 under the control of the circuit 21c. The enabling signals for each gate are shown in FIG. 2(a) next to the appropriate gate. Thus the contents of the stores 23, 23' appear on outputs 46 and 47 addressing the location of the primary store associated with the virtual address A. In this way any address associated with a virtual address can be obtained at the outputs 46 and 47 from the registers 23, 23' to 26, 26'.

When the instruction EXC (A, B) is given, the decoder 82 again provides the output $\alpha_0$, this time receiving the two bits representing the virtual address A from the control circuit 21, and at the same time the second decoder 83, receiving the two bits representing the virtual address B from the control circuit, provides that output which will access the real address associated with B; for example $\beta_1$. The real address stored in the registers 24 and 24' appear at outputs 48 and 49 when the clock pulse $t_0$ appears. Hence in this example after $t_0$ the contents of the registers 23, 23' will then read into the registers 44, 44' and the contents of the registers 24, 24' will then read into the registers 45, 45'. When the clock pulse generator 84 provides a second pulse $t_1$ again under the control of the circuit 16, gates 61 and 62 in a group of AND gates 59 to 66 open since $\beta_1$ is present causing the contents of the registers 44, 44' to be read into the registers 24, 24'. At the same time the gates 51, 52 in a group of AND gates 51 to 58 open since $\alpha_0$ is present causing the contents of the registers 45, 45' to be read into the registers 23, 23'. Thus the 2 bits which were formerly in the register 23, 23' are now in the registers 24, 24' and vice versa with the result that the real location formerly associated with the virtual address A is now associated with the virtual address B and vice versa.

On switch on, the bistable circuits 23 to 26 and 23' to 26' are set to initial values such that real and virtual addresses are identical.

A further reduction in programme length is achieved by having a flag which can be set to make certain changes in the virtual addresses of the primary store and the real addresses of the secondary store by changing one bit of each address. The flag may be set by an instruction to the control circuit 21 or by the value of one bit in the word of a DSU. It may therefore be set to a single value for a whole programme or it may change during the programme.

The Exclusive OR function is to be carried out between the binary flag signal and the second most significant bit in the address when the instruction setting the flag has a prime immediately following the address of one DSU in the primary or secondary store; for example where an address is written A' (referring to a DSU) or A'$_1$ (referring to a word). The Exclusive OR function is also carried out between the binary flag signal and the fourth most significant bit in the address when the instruction has a prime following the address of a word in a DSU; for example when a word address is written A$_2$'. The known Exclusive OR logic circuits 17 and 18 are connected in channels for the fourth and second most significant bits, respectively, and are set by applying one bit of a binary input corresponding to the flag to an input 70.

The effect of changing the second most significant bit is to change the virtual addresses as follows:

A' → B
B' → A
C' → D
D' → C

The effect of changing the second most significant bit in the address of a word is shown by the example: A'$_1$ → B$_1$.

Similarly by changing the fourth most significant bit and using a channel 81 the following transformation occur:

$W_0'$ → $W_1$
$W_1'$ → $W_0$
$W_2'$ → $W_3$
$W_3'$ → $W_2$

The evaluation of certain simple expressions is carried out by the computer 21a according to the DSU's held in predetermined virtual addresses; for example if the virtual address A holds a DSU referring to a value $f$ in the main store, the virtual address B similarly refers to a value $g$ and the virtual address C refers to the operator minus, then an evaluate instruction causes the computer to carry out the evaluation $f - g$. With the virtual address C referring to the operation divide then the evaluation of $(f/g)$ would be carried out.

The operation of the primary and secondary stores is also controlled by the following instructions brought into operation by the computer 21a as it performs a programme and held as a subroutine by the read-only memory:

LOAD A WITH C$_0$

This instruction causes the virtual locations A$_0$, A$_1$, A$_2$ and A$_3$ of the primary store to be loaded by the computer 21a with the contents of the plex consisting of four words whose first word has the address in the main store equal to the contents of C$_0$; the effect is A$_0$: = ((C$_0$))
A$_1$: = ((C$_0$) + 1)
A$_2$: = ((C$_0$) + 2)
A$_3$: = ((C$_0$) + 3)

where (( )) denotes 'contents of'.

DUMP B INTO W$_1$

This instruction copies the contents of the virtual location B in the four main store locations commencing with the address held by the real location W$_1$; the effect is (W$_1$) : = (B$_0$)
(W$_1$) + 1 : = (B$_1$)
(W$_1$) + 2 : = (B$_2$)
(W$_1$) + 3 : = (B$_3$)

COPY C$_1$ INTO X$_3$

By this instruction the contents of the virtual address C$_1$ are copied into the real secondary store location X$_3$.

EXCR (W$_1$, Z$_0$)

Here the contents of the real secondary store locations $W_1$ and $Z_0$ are exchanged.

A number of examples of the use of the data processor of FIG. 1 will now be given. It is particularly useful in dealing with data structures often found in graphics. The three most important of these structures are as is mentioned above list, tree and ring structures. Dealing first with a list structure, where an unknown number of items of data or instructions are to be stored, it is a known useful technique to use a list. Each DSU in the list contains an item of information and also the address, known as a pointer, of the next DSU in the list.

Figure 3:
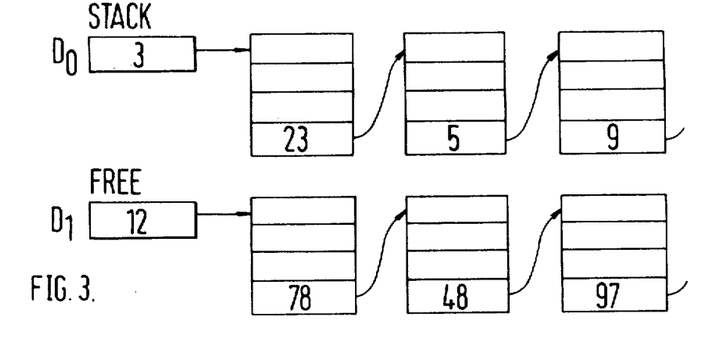
FIG. 3 illustrates the arrangement of plexes in a free list and a stack list in the data processor.

In this specification a convention is adopted whereby the virtual address $D_0$ contains the stack pointer giving the address of the location in the main store which holds the first DSU in the list, and the virtual location $D_1$ holds the free pointer giving the address in the main store of the first location in a list of the empty locations in the store. A partial diagram of the main and primary stores of FIG. 1 showing how the stack list and free list are distributed is given in FIG. 3. The virtual location $D_0$ holds a pointer 3 which is the address of the first word in a DSU occupying four locations of the main store. The last word of this DSU holds the number 23 which is the address of the next DSU in the list, and so on. The virtual location $D_1$ holds the number 12 which is the address in the main store of the first free DSU location in the main store. Each DSU in the free list gives the address of the next DSU in the free list.

The following subroutine stored in the read-only memory 21c and addressed by the instruction PUSH or PULL, as occurring in a programme for the computer 21a, is used to add to the stack, or remove data from the stack, respectively.

1. LOAD A WITH $D_1'$
2. IF $A_3 = 0$ GO TO LIST EMPTY
3. COPY $D_0'$ INTO $B_3$
4. COPY $D_1'$ INTO $D_0'$
5. COPY $A_3$ INTO $D_1'$
6. DUMP B INTO $D_0'$

When it is required to push an entry into the stack the data to be stored is pre-loaded, under the control of the computer 21(a), in the virtual locations $B_0$, $B_1$ and $B_2$ and the above subroutine is entered with the flag F equal to 0 as specified by the instruction PUSH in the computer programme. Instruction 1 then fills the DSU location A with the DSU at the main store address given by $D_1$. The second instruction is to terminate the subroutine if the list is empty. By the third instruction the present stack pointer is entered into the virtual location $B_3$ and the fourth instruction provides a new stack pointer having the address of the first free plex location in the free list. The fifth instruction provides a new free list pointer by copying the contents of the first free DSU giving the address of the next free DSU into $D_1$. By carrying out instruction six the new data in virtual locations $B_0$, $B_1$ and $B_2$ is written into what now becomes the first DSU location on the stack list and what was the first DSU location on the free list.

To pull the stack the flag F is set equal to one under the control of the computer programme. This time the effect of the first instruction is to load the virtual address A with the contents of the first DSU of the stack list since $D_1'$ becomes $D_0$. Now the data required can be retrieved from $A_0$, $A_1$ and $A_2$. In the third instruction $D_0'$ becomes $D_1$ so the address of the free list pointer is loaded into the virtual location $B_3$. In the fourth instruction the stack list pointer at $D_0$ is made the new free list pointer at $D_1$ and by the fifth instruction the last word in the virtual address A is loaded into the virtual address $D_0$ to provide the new stack list pointer. The last instruction adds a DSU empty except for the pointer 12, to the free list, the address of this DSU being that of the DSU which is now at the virtual address A waiting for data to be read out.

An example of manipulation of the second type of data structure, the tree structure, will be given. By means of a tree an expression which is to be calculated can be represented by DSU's held in the main store and interlinked by means of pointers. The structure so formed allows an expression to be evaluated when a change in one parameter is made, without the whole calculation being carried out in full if the nature of the parameter and the calculation is such that this is possible.

Figure 4:
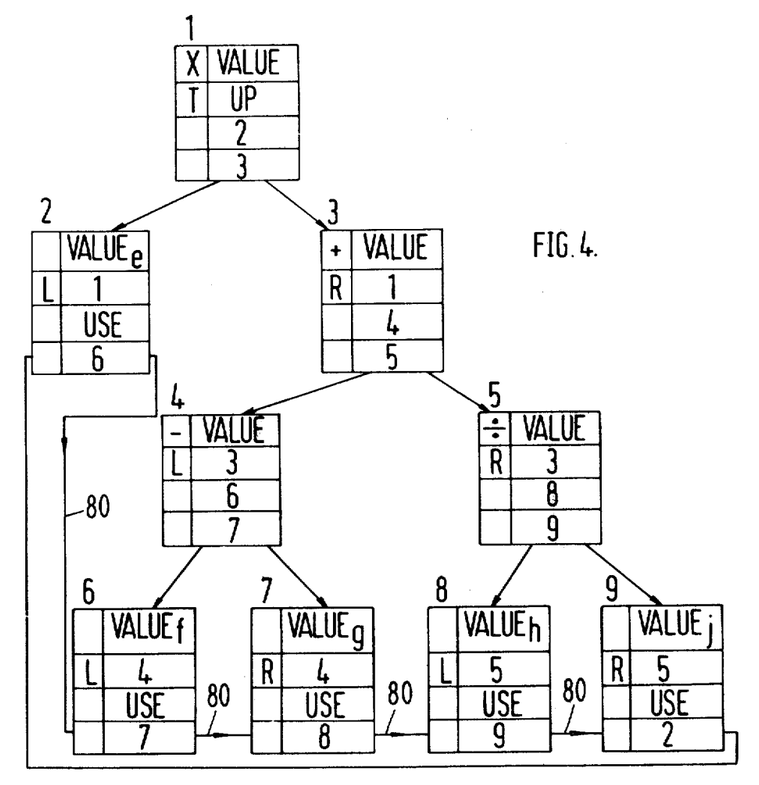
FIG. 4 illustrates tree and ring data structures in the data processor.

A tree for the expression $$e \times \left[ \left( f - g + \frac{h}{j} \right) \right]$$

is shown in FIG. 4 where DSU's 1 to 8 are shown interlinked by means of arrows. The DSU's are of two types and their links will be apparent from the following description of their forms.

The operand DSU format is as follows:

| L or R | pointer to value<br>up pointer<br>pointer to use ring |
|---|---|

An example of an operand DSU is DSU number 7 which stores in the last twelve bits of the first word the address of the value of the parameter g. In the first four bits of the second word a bit representing R is stored denoting that the DSU 7 is branched to the right of the next higher DSU in the hierarchy, that is the DSU 4 whose address is stored in the last twelve bits of the second word. The last twelve bits of the third word in the DSU are for use in a ring data structure, which is described below, for use in entering parameters into the tree.

The operator DSU format is as follows:

| operator<br>L, R or T | pointer to value<br>up pointer<br>down pointer L<br>down pointer R |
|---|---|

An example of the operator DSU format is shown by the plex 3 which has in the first four bits of the first word the plus operator stored and in the last twelve bits of the first word the address of the value of the result of this operation. The first four bits of the second word store R indicating that this DSU is the right hand branch from the next higher DSU. If the T were stored it would indicate that the DSU is at the top of the tree. The second 12 bits of the first word give the address of the next higher DSU. In the last twelve bits of the third and fourth words the addresses of the left and right next lower DSU's are stored, respectively.

As is mentioned above, the computer 21(a) is constructed to evaluate the expression by taking the DSU at A and operating on it using the DSU at virtual address B according to the operator hold in the DSU at virtual address C.

As with the push and pull operations a micro-programme held by the read-only memory 21(c) controls the evaluation or partial re-valuation of the expression. This micro-programme is as follows:

1. LOAD C WITH $C_2$
2. COPY $C_2$ INTO $D_3$
3. SET F WITH SIDE $(C_1)$
4. EXC $(C, A')$
5. LOAD C WITH $A'_1$
6. LOAD B' WITH $C_3'$
7. EVALUATE
8. IF SIDE $(C_1)$ IS NOT = T GO TO 3
9. PUSH $C_1$
10. LOAD C WITH $D_3$
11. GO TO 2.

Initially the virtual address $C_2$ contains a pointer used in entering the value of a parameter: that is, the programme controlling the computer 21(a) loads any new parameter into a main store location and transfers the address of this location to the virtual address $C_2$. For example if the value of g has been changed and main store addresses are designated by DSU numbers in FIG. 4, then $C_2$ will contain 7. The first instruction sets the DSU location at 7 into C and the second saves the pointer for further use in $D_3$. Instruction 3 sets the flag F with either left (L) or right (R) according to the value held in $C_1$ which is this case after instruction 1 is R. This means that flag F equals 1. Using the translator 14 and the logic means 17, instruction 4 moves the DSU 7 to the virtual address B since A' becomes B with F = 1. Thus the DSU pointing to the value of g is now held in the virtual address B where it will be used in the evaluation process as appropriate to its address. On instruction 5 the DSU whose address is at $A'_1 = B_1$ is loaded into C so that C holds the minus operator. The DSU 6 is loaded into virtual address A by instruction 6 so that the value f is now held at this address. The DSU's 4, 6 and 7 are now positioned so that on instruction 7 the expression f-g is evaluated by the computer 21(a).

Instruction 8 terminates the subroutine if the top of the tree has been reached but in this example the subroutine returns to instruction 3 and carries out the evaluation (f-g)+(h/j), this time with F = 0, in a similar way to that described for DSU's 4, 6 and 7. When the top of the tree is reached the up pointer of the top DSU is stacked by instruction 9 for future use. The pointer to the next sequence of operations is retrieved from $D_3$ by instruction 10 and the next sequence is initiated by instruction 11.

An example of the manipulation of the third data structure, the ring structure, is now given with reference to FIG. 4. The DSU's 2, 6, 7, 8 and 9 are joined as a list by means of links 80 but with the end of the list also joined to the beginning and forming a ring. Initially the ring is entered at DSU 2 under the control of a read-only memory micro-programme and the parameters f, g, h and j are entered by calling up each DSU in turn to the primary store where the micro-programme causes the value of the parameter to be entered in the appropriate DSU. When the DSU 2 is reached again by traversing the ring the subroutine is ended.

The third word of each of the DSU's 2, 6, 7, 8 and 9 designated USE also contains a pointer in a ring structure but each word is part of a different ring. It is assumed that there are a number of trees several of which use each parameter. If one parameter is changed, for example g, the ring for g including DSU's in different trees is traversed.

Although the data processor of FIGS. 1 and 2 operates with DSU's of 4 words each of 16 bits it will be apparent that plexes of any practical size and any practical word length can be used in carrying out the invention. Similarly the block circuits used in FIG. 1 need not be those specifically shown and particular other forms of address translator can be used. Only a few examples of data structures and their manipulation by the data processor have been given to illustrate the operation of the data processor but of course there is an infinite variety of data structure and their uses which can be manipulated in the processor.

We claim:

1. Apparatus for use in carrying out data processing operations in which data items are called from storage by an address, the apparatus including a primary store for storing items of data at a plurality of storage locations, the primary store having an address input and each location having a unique real address which when applied to the said address input in the form of a real address allows transfer of data items to and from that location of the primary store, a main store having a greater number of storage locations than the primary store, means for allowing transfer of stored items between the primary and main stores, an address translator, having its output coupled to the address input of the primary store, for translating into real addresses for data items from virtual addresses for said items to allow programs of data processing operations which use virtual addresses to be used, and a program storage means for storing said programs which use virtual addresses, each real address being changeably associated with a virtual address particular thereto, changes in the associations between real and virtual addresses effecting changes in the said programs, and the translator including translator storage means, separate from the primary and main stores, for storing addresses, and conversion means for changing the associations between real and virtual addresses independently of transfer of data items between the main and primary stores, said conversion means including logic means for changing said associations while real addresses of data items remain the same by operating upon addresses already held by the translator storage means, the said changes in associations being carried out by the conversion means in response to instruction signals applied to the conversion means.

2. Apparatus according to claim 1, wherein the translator storage means includes real-address storage means comprising single-bit stores each of which, in operation, contains one bit of a real address, with different single-bit stores containing bits of different real addresses, and means for decoding virtual addresses, coupled to the single-bit stores to allow the said bits of real addresses to be read from the translator, and wherein the conversion means is constructed to transfer real-address bits from one single-bit store to another in order to change the association between real and virtual addresses.

3. Apparatus according to claim 1, including further logic means for changing at least one of the bits of a virtual address according to signals applied to the further logic means from said program storage means.

4. Apparatus according to claim 1 including a secondary store having a relatively short access time in relation to the main store, and means for transferring items of data between the three stores.

5. Apparatus according to claim 3, wherein the further logic means includes a register for receiving virtual addresses one at a time for application to the translator, and a number of Exclusive-OR circuits coupled to receive the said control signals, and each coupled between one stage of the register and the translator to form a different virtual address from that held by the register by changing a bit of the virtual address held by the register, if the control signals so require, in applying virtual addresses to the translator.

6. Apparatus according to claim 1, wherein the conversion means includes means for changing at least one of the more significant bits only in virtual addresses to allow the association between a block of virtual and real addresses to be changed, rather than the association between individual words.

7. Apparatus according to claim 1, wherein the translator storage means includes a number of groups of first bistable circuits, one group associated with each virtual address and one bistable circuit in each group being associated with a bit of predetermined significance in a virtual address, a number of output terminals, a first group of gates with one gate for each bistable circuit coupled between that bistable circuit and the output terminal which is associated with a bit of the same predetermined significance, and a first decoder adapted to receive virtual addresses and provide a number of unique output signals, one for and associated with each virtual address in dependence on the virtual address received, the decoder being connected to apply each output signal as an enabling signal to those gates in the first group which are coupled to bistable circuits associated with the same virtual address as that output signal.

8. Apparatus according to claim 7 wherein the logic means includes first and second groups of second bistable circuits each having the same number of bistable circuits as each first group of bistable circuits, each second bistable circuit in a group being associated with a respective bit significance in a virtual address, each bistable circuit in each group having a set terminal to which signals are applied to change the conduction state of that circuit and an output terminal the voltage of which indicates the conduction state currently present in the bistable circuit, second, third and fourth groups of gates, the first and second groups of gates being coupled between the output terminals of the first bistable circuits and the set terminals of the first and second groups, respectively, of the second bistable circuits to allow bistable circuit conduction states to be transferred from the first to second bistable circuits associated with the same virtual address bit significances, the third and fourth groups of gates being coupled between the output terminals of the first and second groups, respectively, of the second bistable circuits and the set terminal of the first bistable circuits to allow bistable circuit conduction states to be transferred from second to first bistable circuits associated with the same virtual address bit significances, second decoder means adapted to receive a virtual address and to provide a unique output signal associated with each virtual address, the first and second decoder means being connected to apply each of their output signals as an enabling signal to those gates, in the first and fourth groups, and second and third groups, respectively, which are coupled to first bistable circuits associated with the same virtual address as that output signal, and a pulse generator connected to apply first pulses as enabling signals to gates in the first and second groups and subsequently second pulses as enabling signals to gates in the third and fourth groups wherever a change in virtual address is to be made.

9. Apparatus according to claim 8, wherein there are two bistable circuits in each group, and each bistable circuit is associated with a more significant bit.

* * * * *